United States Patent [19]

Evich et al.

[11] 4,282,256

[45] Aug. 4, 1981

[54] PREPARATION OF AN ANIMAL FEED SUPPLEMENT FROM FISH CANNERY PROCESS WASTE WATER

[75] Inventors: Vince J. Evich, San Pedro; Gerald C. Brown, Long Beach; Howard J. Dunn, Lomita, all of Calif.

[73] Assignee: Star-Kist Foods, Inc., Terminal Island, Calif.

[21] Appl. No.: 87,080

[22] Filed: Oct. 22, 1979

[51] Int. Cl.³ .............................................. A23K 1/10
[52] U.S. Cl. ........................................ 426/7; 426/60; 426/623; 426/630; 426/635; 426/807; 210/623; 210/705; 210/710; 210/768; 210/770
[58] Field of Search ...................... 426/60, 623, 54, 7, 426/55, 31, 541, 44, 46, 478, 480, 474, 807, 630, 635; 210/2, 10, 4, 13, 15, 18, 44, 45, 53, 221 R, 67, 68, 735, 620, 623, 703–705, 710, 767, 768, 770

[56] References Cited

U.S. PATENT DOCUMENTS

| | | | |
|---|---|---|---|
| 3,594,176 | 7/1971 | Morris | 426/541 X |
| 3,788,478 | 1/1974 | Savage | 210/221 R |
| 3,936,375 | 2/1976 | Nettli | 210/45 |
| 4,061,568 | 12/1977 | Hall | 210/44 |

OTHER PUBLICATIONS

Morrison, "Feeds and Feeding", Morrison Publishing Co. 1957, pp. 413–414, 524–527, 535–537 & 555–556.

Primary Examiner—R. B. Penland
Attorney, Agent, or Firm—Fulwider, Patton, Rieber, Lee & Utecht

[57] ABSTRACT

There is disclosed a method for the preparation of an animal feed supplement from fish cannery waste process water in which the water is maintained under aerobic conditions and is processed through a flotation cell to separate the oils and proteins contained in the water as a concentrated sludge. The sludge is dewatered, blended with a bulk, solid carrier preserved against oxidative spoilage of the lipids with an effective antioxidant, and dried in vacuum under low temperature conditions to obtain an animal feed supplement in dry particulate form. The processing of the waste water is done under aerobic conditions to promote the growth of yeast and non-toxic, aerobic, bacterial improve color and odor and texture, and enhance the feed value of the sludge recovered from the processing.

12 Claims, 1 Drawing Figure

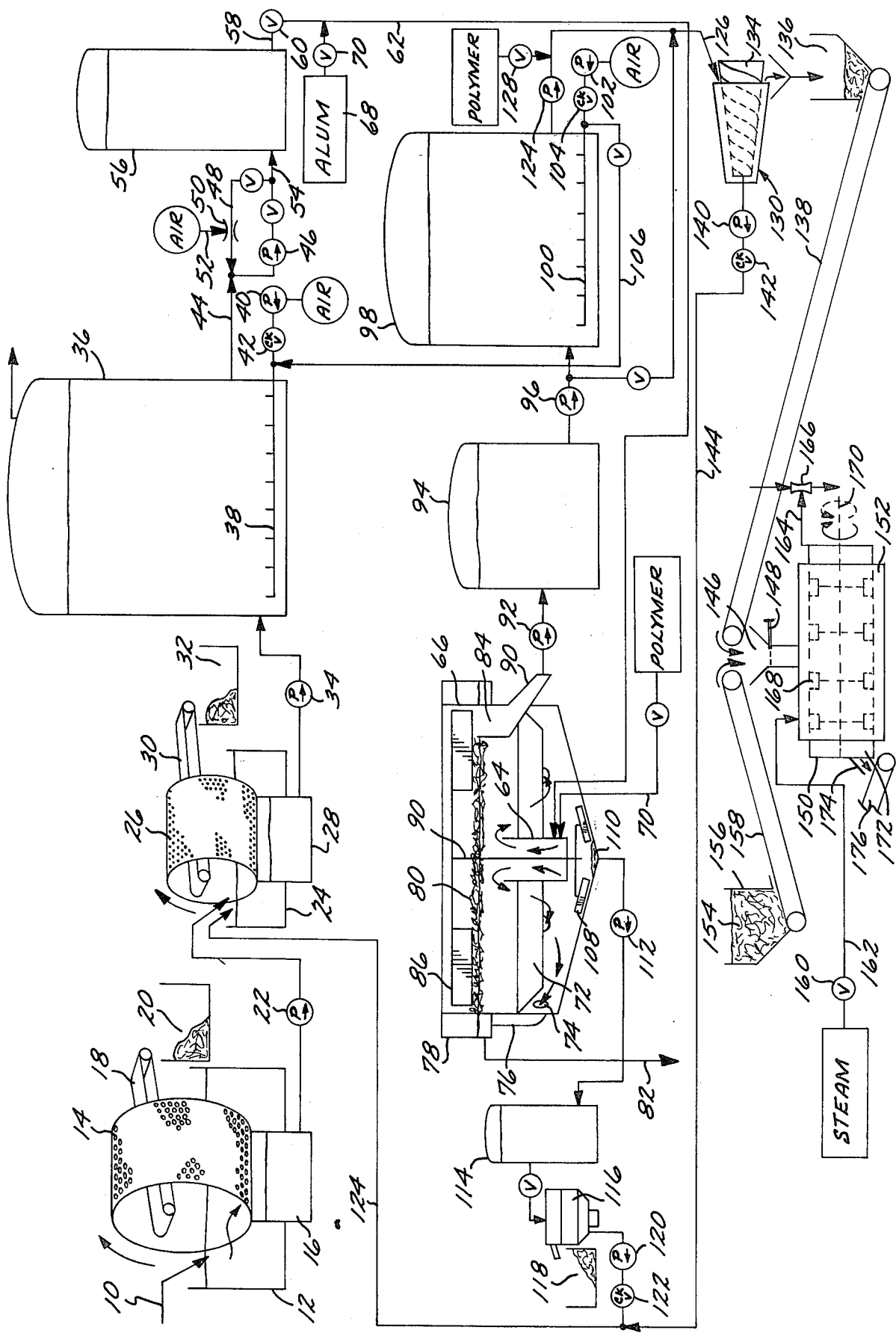

PREPARATION OF AN ANIMAL FEED SUPPLEMENT FROM FISH CANNERY PROCESS WASTE WATER

BACKGROUND OF THE INVENTION

This invention relates to a method for treatment of fish cannery waste process water and, in particular, to a method for the preparation of an animal feed supplement therefrom.

BRIEF STATEMENT OF THE PRIOR ART

Waste process water is collected in a fish cannery from a number of operations. Bail water, used to thaw the fish, is collected from the fishing boats; water is collected from washing tote boxes used to transport the fish; large quantities of water are collected from thawing of frozen fish received in the cannery; and large quantities of water are collected from washing of the butchering area and equipment, such as the tables, floor and machinery.

The resultant water has been processed by screening to remove large solids and debris, admixed with air and introduced into a flotation cell from which a clarified water suitable for processing in an industrial sewage treatment plant has been separated. The sludge separated in the flotation cell has been trucked to disposal cites, however, encroaching urbanization has made this practice more and more objectionable.

BRIEF DESCRIPTION OF THE INVENTION

This invention comprises a method for the recovery of animal feed values from fish cannery waste water by utilizing the sludge separated in a flotation cell treatment of the waste water as an additive for preparation of an animal feed supplement. We have discovered that the sludge separated by flotation is a very desirable feed supplement ingredient, provided that the water is processed under aerobic conditions and when the sludge is processed by dewatering, vacuum drying and granulating in admixture with a bulk nutritive solid carrier. The flotation cell separation of the sludge significantly concentrates the nutritional content of the water, and the aerobic processing of the waste water maintains these nutritional portions in a palatable condition permitting subsequent use of the sludge as a feed supplement ingredient.

BRIEF DESCRIPTION OF THE DRAWING

The invention will be described with reference to the FIGURE which comprises a schematic flow diagram, of the process.

DESCRIPTION OF PREFERRED EMBODIMENT

Waste process water from a fish cannery enters the process shown in FIG. 1 through line 10 and is discharged into vessel 12. A cylindrical screen 14 is rotatably mounted within vessel 12 and is rotated by a motor, not shown. The water which enters sump 16 is filtered by screen 14 and the coarse solids in the water are removed and deposited on a conveyor 18 which is mounted within the rotary screen 14 in a position to receive material which falls from the interior of the rotary screen 14. The solids deposit on the travelling belt 18 and are conveyed out of the filter and into a bin 20 for discard.

The waste process water flow thru pipeline 16 and is discharged into one of two vessels 24. A screen drum 26 is rotatably mounted in vessel 24. This screen comprises a plurality of closely spaced triangular rods which are spaced apart from about 0.01 to about 0.03 inch. The screen is rotatably mounted above sump 28 and filters the water to remove the coarse particles. The latter are discharged onto the conveyor 30 which discharges the solids into bin 32 for combining with press cake and recovery as dry fish meal. The screen drum 26 is a conventional commercial unit available under the designation "Roto Strainer". The screen is provided with a motor drive for rotating the screen drum at a moderate speed, e.g., from about 15 to about 30 revolutions per minute.

The water collected in sump 28 is conveyed by pump 34 to a storage vessel 36. Storage vessel 36 provides a surge capacity to the system to permit continuous operation. The water stored in vessel 36 is continuously aerated by the discharge of air through the sparger 38 which is located at the bottom of vessel 36. Air is supplied to the sparger by blower 40, through check valve 42. The function of the air sparger is to remove hydrogen sulfide odors and create an aerobic environment, as opposed to an anaerobic state.

The process water is continously withdrawn from vessel 36 through line 44 which discharges to the suction side of pump 46. A portion of the discharge of pump 46 is returned to the suction side of the pump through recycle line 48 which contains an air inductor 50. The latter includes a Venturi passageway with an inlet 52 for induction of atmospheric pressure air at its low pressure point. Sufficient air is introduced into the process water through pump 46 to saturate the water at the pump pressure.

Pump 46 pressures the process water to a pressure from 10 to about 50 psig. The water is discharged through line 54 into a vessel 56 which serves as a retention zone that provides sufficient holding time of the water and air mixture to achieve complete saturation of the water with air at the vessel pressure. The vessel 56 has a sufficient capacity, relative to the throughput of the process to provide a retention time from 1 to about 20, preferably from 2 to about 5 minutes.

The process water saturated with air is discharged from the retention zone through line 58 and is depressured to substantially atmospheric pressure through throttle valve 60. The resultant mixture is discharged through line 62 into the bottom of a vertical, open-topped tube 64 within the flotation vessel 66. The purpose of this pressurized air, when released in flotation vessel 66, is to attach small air bubbles to the floc and lift them to the surface.

An inorganic flocculating agent is added to the water from a storage tank 68, through valve 70 at a rate controlled to provide a concentration from 50 to about 150 parts per million, preferably from 70 to about 100 parts per million of dry alum, the flocculating agent in the waste process water. The floculating agent which can be employed can be aluminum sulfate which is purchased as a stock solution containing 48.51% by weight percent of dry aluminum sulfate. Alternatively, the inorganic flocculating agent can be ferric chloride which can be supplied as a solution containing from 30 to about 35 weight percent ferric chloride. The operation of the flotation cell within vessel 66 is also facilitated by the addition of a polyionic polymer through valve 68 and line 70 at a rate controlled to provide a concentration of the polymer in the water within vessel 66 from, 5 to about 2.0, preferably from 1.0 to about 1.5 parts per million. The polyionic polymer employed can be a polyanion or a polycation, or a combination of both. These polymers are commercially available products useful for water treatment. These polymers have recurring anionic or cationic functional groups along their polymer chain. Designations of some commercial anionic products which are in this general category are the following:

| Product | Manufacturer |
| --- | --- |
| Hydroflock #235 | Aqua Ben Chemical Co. |
| Calgon #WT 3000, | Calgon Corp. |
| Tretolite TFL 362 | Petrolite Corp. |
| Percoe #726 | Allied Colloids, Inc. |

Each of the above products are water soluble synthetic polyacrylamides based on the monomer:

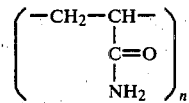

The release of the pressure on the air-saturated, waste process water forms a froth which releases air bubbles in the water which attract the suspended fats and protein particles and carry these particles to the surface of vessel 66, forming a foam sludge on the surface of the water within vessel 66. A deflection baffle 72 extends about the inner periphery of vessel 66 near its midline, projecting over a plurality of holes 74. Each hole communicates with an upright tube 76 that extends into the base of a collector trough 78 about the upper periphery of vessel 66. The water which separates from the froth 80 in vessel 66 flows downwardly, through hole 74 and the upright tube 76 into the collection trough 78 from where it is withdrawn as a clarified liquid for discharge to an industrial sewer through line 82.

A sludge withdrawal tube 84 is mounted at one side of vessel 66 and extends into the vessel to a height approximately 8-12 inches above the liquid level in this vessel. A plurality of paddles 86 are mounted on radial arms 88 which depend from a central rotatably mounted shaft 90. The paddles 86 are positioned to sweep the foam sludge from the liquid surface in vessel 66 and deposit the sludge into the sludge withdrawal conduit 84. The collected sludge is withdrawn through standpipe 90 which discharges into transfer pump 92 for conveying the sludge to a surge vessel 94. The sludge is transferred from line 94 by pump 96 to an aeration vessel 98 where it is continuously aerated by air introduced into the bottom of the vessel through sparger 100. The air is delivered by blower 102, through check valve 104 and a branch line 106 is used to provide manifolding for interconnecting of the blowers 40 and 102. The function of this air bubbling in the sludge storage tank 98 is to improve the odor texture, and color of the sludge to render it acceptable for animal feeds.

The grit which separates in the flotation vessel 66 accumulates on the bottom surface and is directed towards the apex of the conical bottom of vessel 66 by blades 108 which are also mounted on shaft 90 for rotation in the vessel. The grit accumulation 110 is periodically purged from the vessel by pump 112 and passed to a collection vessel 114, then to a vibratory 100 mesh screen 116 from which the solids are discharged into a bin 118 for discard and the process water is removed by transfer pump 120 and passes through check valve 122 and line 124 for recycling to vessel 24.

The aerated sludge within vessel 98 is withdrawn by transfer pump 124 and passed through line 126 to a dewatering treatment. A polyionic polymer is added to the water through valve 128 at a rate sufficient to provide a concentration in the total dry solid from 0.1 to about 1.0 weight percent of the polyionic polymer. The particular polymer added to the water at this point in the process is of an opposite charge to the polyionic polymer added through valve 68 to the flotation zone within vessel 66. The addition of the polymer to the water prior to the dewatering treatment greatly facilitates the dewatering treatment by breaking the emulsion stability of the sludge.

Designation of commercial products which are in the category of cationic polymer products are the following:

| Product | Manufacturer |
| --- | --- |
| Hydrofloc #1124 | Aqua Ben Chemical Co. |
| Calgon E 2076 & WT 2830 | Calgon Corp. |
| Tetrolite TFL 362 | Petrolite Corp. |
| Percoe 728 & 776 | Allied Colloids, Inc. |
| Magnofloc 2535 C | American Cynamid Corp. |

The sludge is discharged from line 126 to a suitable dewatering unit, preferably to a centrifuge 130. The centrifuge employed is a commercial unit available under the designations Desludger, and Super-Decanter, and Kruger Total Centrifuge, and comprises a horizontally mounted conical drum 132 with an internal, coaxial, conical screw conveyor 134. The centrifuge is mounted for rotation at speeds of from 2500-4000 rpm and the outer conical screen 132 rotates at a differential speed relative to screw conveyor 134 whereby the latter removes solids which are separated in the interior of the conical screen drum 132. The solids are continuously discharged from the centrifuge into a hopper 136 of conveyor 138. The liquid is withdrawn from the centrifuge by transfer pump 140 and passed through check valve 142 and line 144 for recycling to vessel 24.

The solids separated from the sludge are continuously discharged into a hopper 146 provided with a slide gate 148 for discharge into the interior of a horizontal, cylindrical drum 150 which is surrounded by a steam jacket 152.

In order to protect the highly oxidative unsaturated fatty acid content of the lipo-protein component, an effective anti-oxidant, such as Ethoxyquin, is added and thoroughly mixed into the sludge prior to vacuum drying on the bulk carrier material. The fatty acid profile of the lipo-protein component is shown in Table D and illustrates the high proportion of polyunsaturates. The addition of 0.1% of ethoxyquin to the moist sludge adequately protects the lipids from oxidation during the drying cycle and subsequent storage periods.

Bulk carrier solids 154 are introduced into the system through hopper 156 and conveyor 158 which discharges these solids at a rate controlled to provide the correct proportionating of the carrier solids and the sludge solids. The bulk carrier solids are added to the sludge solids in volume proportions from about 1 part carrier to 4 parts sludge solids to about 1 part carrier to 1 part sludge solids. Various dry bulk, animal-edible material can be used as the source of the bulk carrier solids, including cereal products, such as brewer's yeast residue, spent brewer's grain, nuts and oilseed press cake meals, cottonseed meal, chopped hays, alfalfa, coarse ground corn cobs, rice hulls, beet pulp, bagasse, potato peeling by-product, etc. The bulk carrier solids are used at a sufficient concentration, relative to the sludge solids to produce a dry granular product after the evaporative treatment in drum 150. The solids are discharged into the drum 150 and slide gate 148 is closed and the interior of the drum is heated by steam admitted to the jacket 152 through valve 160 and line 162. The vapors evaporated from the solids within drum 150 are removed through vent line 164 and passed to a suitable evacuation means such as a barometric condensor 166 or ejector operated by either water or steam pressure. The evacuation means provides a subatmospheric pressure from about 15 to about 30, preferably from 25 to about 28 inches mercury column within the vessel 150. The purpose of dehydrating under vacuum at low temperature is to preserve the nutritive quality of amino acids and polyunsaturated lipids.

The solids within vessel 150 are continuously agitated by a plurality of blades 168 which are mounted on radial arms carried on central shaft 170. One side of the blades is parallel with the axis of the vessel 150 so that rotation of the shaft 170 in one direction will tumble the solids in vessel 150. The opposite side of the blades, however, is at an angle to the axis of vessel 150 so that rotation of the shaft 170 in the opposite direction moves the solids through the drum, towards the end 172 in which is mounted gate 174. When the solids have been dried and granulated to provide solid particles having moisture contents from 5 to about 12, preferably from 8 to about 10 weight percent water. The temperature is allowed to rise to 200° F. for a brief period of about 10 minutes in order to destroy any pathogenic bacteria such as Salmonella. The drying and granulating process is then stopped, and the vessel 150 is permitted to cool and is vented to atmospheric pressure. Gate 174 is opened, the blades 168 are rotated in a direction to convey the solids which are removed and discharged onto a product transfer conveyor 176 as the feed supplement product of the process. This product then is incorporated into a balance feed ration at a level of 5 to 25% for feeding livestock and poultry.

The process will be described with reference to the following example:

EXAMPLE

Waste process water from a fish cannery is processed through large rotary screens which remove the large particulate matter. The water is passed to a storage tank where air is continuously bubbled through the stored waste water. The cannery waste water is collected principally from thawing of frozen fish and from cleaning of the tables, floor and equipment in the fish butchering area.

The water is admixed with air at a pressure of 50 psig and held in a retention zone for 2 to 5 minutes to permit thorough admixing of the air with the water. The aerated water is withdrawn from the retention zone and discharged at atmospheric pressure into a flotation cell of substantially the configuration of vessel 66 shown in the FIGURE. A quantity of aluminum sulfate in an amount of 77 parts per million is admixed with the aerated water prior to its introduction into the flotation cell and 1.5 parts per million of a poly-anionic polymer, is also added to the water in the flotation cell.

The sludge is withdrawn from the flotation cell and is passed to a storage vessel where it is continuously aerated by bubbling air therethrough. Clarified water is removed from the flotation cell and discharged from the treatment process. The grit which settles to the bottom of the flotation cell is periodically pumped from the cell and passed to vibratory screens which remove the solids.

The sludge which is withdrawn for further processing and conversion into an animal feed supplement has the following composition:

TABLE A-1

| Ingredient | Range | Content (Weight Percent) |
|---|---|---|
| Water | 94–88% | 90.0 |
| Fat | 3.36–6.72% | 5.6 |
| Ash | 0.84–1.68% | 1.5 |
| Protein | 1.74–3.48% | 2.9 |
| Fiber | 0.06–0.12% | 0.1 |

The amino acid composition of the protein component of the sludge is as follows:

TABLE A-2

| Amino Acid | % of Protein |
|---|---|
| Aspartic Acid | 7.81 |
| Threonine | 3.51 |
| Serine | 3.34 |
| Glutamic Acid | 8.50 |
| Proline | 2.69 |
| Glycine | 3.77 |
| Alanine | 4.77 |
| Valine | 3.38 |
| Cystine | 0.43 |
| Methionine | 2.08 |
| Isoleucine | 2.78 |
| Teucine | 5.90 |
| Tyrosine | 3.38 |
| Phenylalanine | 5.33 |
| Histidine | 1.39 |
| Lysine | 3.16 |
| Arginine | 3.21 |
| Tryptophan | 0.30 |
| TOTAL | 65.73% |

The sludge is processed through a commercial desludger of the type described for centrifuge 130 shown in the FIGURE. The centrifuge is operated at 3,000 rpm and effects the dewatering of the sludge to produce a product having a water content of 25 weight percent. Prior to processing through the centrifuge, 0.1% to 1.0% of the total dry sludge solids of a poly-cationic polymer is added to the sludge to assist in breaking the sludge emulsion and removal of the water.

The dewatered sludge is admixed with dried alfalfa meal or pellets in proportions of 3 volumetric parts of sludge per 1 volumetric part of the alfalfa pellets or meal. The mixture is dried under a vacuum of minimum 20 inches water column and at a temperature of maximum 180° F. The moisture content of the blend is reduced by this drying and the blend is tumbled to granulate it during the drying step. After the product has been dried to approximately the desired final moisture content, it is heated to a temperature of 200° F. for a period of 10 minutes to eliminate any live pathogens. The resultant product has the following composition.

TABLE B

| Ingredient | Content (Weight Percent) |
|---|---|
| Moisture | 5.9% |
| Fat | 36.4% |
| Ash | 12.8% |

TABLE B-continued

| Ingredient | Content (Weight Percent) |
| --- | --- |
| Protein | 20.3% |
| Fiber | 9.5% |
| Caloric Energy | 2468 calories per lb. |

The protein analysis of the feed supplement is as follows:

TABLE C

Amino Acid Composition of the Protein of the Feed Supplement

| Amino Acid | % of Protein |
| --- | --- |
| Aspartic Acid | 9.42 |
| Threonine | 4.3 |
| Serine | 3.26 |
| Glutamic Acid | 8.87 |
| Proline | 3.61 |
| Glycine | 4.67 |
| Alanine | 5.52 |
| Valine | 3.49 |
| Cystine | 0.15 |
| Methionine | 2.12 |
| Isoleucine | 2.95 |
| Teucine | 6.33 |
| Tyrosine | 3.10 |
| Phenylalanine | 4.03 |
| Histidine | 2.68 |
| Lysine | 2.29 |
| Arginine | 3.76 |
| Tryptophan | 0.32 |
| TOTAL | 70.7% |

The fatty acid composition of the feed supplement is as follows:

TABLE D

| Fatty Acid Composition of the Lipid Fraction of Feed Supplement | |
| --- | --- |
| Fatty Acid | % of Lipid |
| Lauric, C 12 | 0.4 |
| Myristic C14 | 8.7 |
| Myristoleic C 14:1 | 0.7 |
| Pentadecanoic C15 | Tr |
| Palmitic C16 | 30.2 |
| Palmitoleic C16:1 | 7.0 |
| Heptadecanoic C16:2 | 2.3 |
| ----- C17 | 1.0 |
| Stearic C18 | 5.6 |
| Oleic C18:1 | 28.2 |
| Linoleic C18:2 | 7.6 |
| Linolenic C18:3 | 2.6 |
| Arachidic C20 | 2.4 |
| Behenic C22 | 3.7 |
| TOTAL | 100% |
| Iodine Value of Total Lipids | 110 |

The invention has been described with reference to the presently preferred and illustrated mode of practice. It is not intended that the invention be unduly limited by this description of the presently preferred mode of practice. Instead, it is intended that the invention be defined by the ingredients and method steps, and their obvious equivalents, set forth in the following claims:

What is claimed is:

1. A method for the preparation of an animal feed from fish cannery wastes comprising:
   aerating fish cannery waste water until the water is substantially saturated with air;
   separating the aerated waste water with an air flotation cell, in the presence of a first polyionic polymer and a floculating agent, into a sludge fraction concentrated in fat and protein, a clarified water fraction, and a grit fraction;
   aerating the separated sludge fraction;
   dewatering the sludge fraction by centrifugation in the presence of a second polyionic polymer with substantially the opposite charge of said first polyionic polymer;
   adding to the aerated, dewatered sludge an antioxidant to prevent oxidation of lipids in the sludge;
   drying the sludge under vacuum at a low temperature while blending with an absorptive, animal-edible bulk carrier solid in volumetric proportions from about 1:4 to 1:1 parts carrier to sludge solids to produce an animal feed supplement as a dry particulate solid.

2. The method of claim 1 wherein said absorptive, animal-edible bulk solid carrier is a nutritive, fibrous, cellular solid.

3. The method of claim 2 wherein said bulk solid carrier is alfalfa meal of finely ground particle size.

4. The method of claim 2 wherein said bulk solid carrier is ground corn cobs, beet pulp, or potato peeling.

5. The method of claim 1 wherein the drying occurs at a subatmospheric pressure from about 15 to 30 inches mercury and a temperature less than about 180° F.

6. The method of claim 5 including the step of agitating the blend during the drying step.

7. The method of claim 6 wherein said drying is performed in a horizontal cylindrical drum and said blend is agitated by rotation of blades about the inner periphery of said drum.

8. The method of claim 1 wherein said blend is dried to a moisture content from 5 to 15 weight percent.

9. The method of claim 1 wherein said blend is dried to a moisture content from 8 to 10 weight percent.

10. The method of claim 1 wherein said antioxidant is about 0.24% by weight of ethoxyquin, which is added to protect the polyunsaturated lipids from oxidation during drying and subsequent storage.

11. The method of claim 1 wherein after drying, the temperature is allowed to rise to about 200° F. for about 10 minutes in order to destroy any pathogenic bacteria; and the product immediately cooled before discharging from the drying chamber.

12. The method of claim 1 wherein the absorptive, animal-edible bulk carrier solid is brewers yeast residue, spent brewers grain, nuts and oilseed press cake meal, cottonseed meal, bagasse, chopped hay, or rice hulls.

* * * * *